(12) United States Patent
Herrick

(10) Patent No.: US 6,813,359 B2
(45) Date of Patent: Nov. 2, 2004

(54) APPARATUS AND METHOD FOR MINIMIZING MULTIPATH INTERFERENCE

(75) Inventor: David L. Herrick, Mont Vernon, NH (US)

(73) Assignee: Bae Systems Information and Electronic Systems Integration Inc., Nashua, NH (US)

(*) Notice: Subject to any disclaimer, the term of this patent is extended or adjusted under 35 U.S.C. 154(b) by 152 days.

(21) Appl. No.: 10/135,208

(22) Filed: Apr. 29, 2002

(65) Prior Publication Data

US 2002/0172369 A1 Nov. 21, 2002

Related U.S. Application Data

(60) Provisional application No. 60/287,826, filed on May 1, 2001.

(51) Int. Cl.$^7$ ................................................ H04H 5/00
(52) U.S. Cl. .............................. 381/3; 381/13; 381/15; 381/2; 381/4; 455/304; 455/296; 455/63.1
(58) Field of Search ................................. 381/3, 13, 15, 381/2, 4, 7, 16, 14; 455/304, 296, 63.1, 504, 506, 65

(56) References Cited

U.S. PATENT DOCUMENTS

| | | | | |
|---|---|---|---|---|
| 5,408,685 A | * | 4/1995 | Kennedy et al. | 455/65 |
| 5,533,063 A | * | 7/1996 | Mitra et al. | 375/340 |
| 6,157,619 A | * | 12/2000 | Ozluturk et al. | 370/252 |

* cited by examiner

*Primary Examiner*—Forester W. Isen
*Assistant Examiner*—Justin Michalski
(74) *Attorney, Agent, or Firm*—Malin, Haley & DiMaggio, P.A.

(57) ABSTRACT

A method and apparatus for minimizing multipath interference for commercial FM signals which use SCA secondary signals in QAM format that includes tracking the time series of phase measurements of a received stereo pilot signal for determining the proper phase reference for demodulation of QAM signals at the center of the time series. Phase measurements of the pilot signal are tracked over a predetermined tracking period. The phase measurement is used to support demodulation of the QAM signal. The SCA secondary signals in QAM format transmitted on commercial FM have minimal multipath interference and Doppler interference by movement of transmitter and receiver (vehicular).

18 Claims, 1 Drawing Sheet

APPARATUS AND METHOD FOR MINIMIZING MULTIPATH INTERFERENCE

This application claims benefit of provisional Application No. 60/287,826 filed May 1, 2001.

BACKGROUND OF THE INVENTION

1. Field of the Invention

A method and apparatus for minimizing multipath interference for commercial FM signals, which use their subsidiary communications authority (SCA) to transmit secondary signals in a quadrature amplitude modulation (QAM) format to reduce or eliminate interference in QAM signals caused by phase abnormalities present in every day FM signals.

2. Description of Related Art

In the United States, FM radio stations are allocated 200 KHz over which to broadcast their signal, which signal actually only takes up about 76 KHz in the stereo format. Under the defining Federal regulations, FM stations have been able to use the excess bandwidth to transmit additional program material on a subscription basis to produce additional revenue. The secondary signals for this subsidiary communications authority, SCA, are modulated onto the station carrier frequency above the usual 38 KHz base band signal.

Various modulation methods have been used for SCA signals and others have been suggested. Quadrature amplitude modulation (QAM) has been suggested and tested because of its capacity to carry sufficient data to provide a quality music signal. However, this data capacity is available because signal phase is used to encode the data, making QAM signals dependent upon signal phase for accurate data demodulation. Whereas the normal analog FM broadcast is not adversely affected by phase and phase is not used in its demodulation, QAM and other similar modulation methods are severely restricted because of phase abnormalities present in everyday FM signals. Phase abnormalities caused by the Doppler effect are an inherent part of relative movement between transmitter and receiver and thus restrict practical use of such SCA QAM signals for vehicular applications. Also troublesome, are the phase abnormalities caused by common multipath interference. Multipath interference causes step changes in the phase of the received signal because the actual signal being received is changing between a direct signal from the transmitter and one or more reflected versions of the direct signal. The reflected signals have a different phase because they have taken a longer path to the receiver. Thus when such a change occurs in the received signal, a QAM demodulator looses its phase reference for demodulation. Although a receiver can recover, over time, from such a change, normal vehicle environments can cause many such changes to occur making a QAM SCA signal unusable.

BRIEF SUMMARY OF THE INVENTION

A method and apparatus for minimizing multipath interference for commercial FM signals, which use their SCA (subsidiary communications authority) to transmit secondary signals in a QAM (quadrature amplitude modulation) format, tracks a time series of phase measurements of the received 19 KHz stereo pilot signal to determine the proper phase reference for demodulation of the QAM signal at approximately the center of the time series. An algorithm compares the phase measurements over the time series to detect sudden changes, as caused by multipath signal interference, as well as to detect gradual changes in phase as caused by relative movement between transmitter and receiver. The appropriate phase reference is then chosen for demodulation purposes. One such algorithm is implemented by a median filter, which reorders measured phase values by amplitude and chooses the value at the center of the reordered series. Operation of the algorithm is aided by removing the normal $2\Pi$ per cycle phase rotation of the pilot signal as part of the phase measurement.

It is an object of this invention to minimize multipath interference for commercial FM signals that use SCA to transmit secondary signals in a QAM quadrature amplitude modulation format by eliminating phase abnormalities that cause interference present in every day FM signals.

It is another object of this invention to provide a method and apparatus for minimizing multipath interference in the receiver from wireless commercial transmissions that utilize commercial FM signals having subsidiary communications authority to transit secondary signals in a QAM format by tracking the phase measurement of the pilot signal to determine proper phase reference for demodulation of the QAM signal.

In accordance with these and other objects which will become apparent hereinafter, the instant invention will now be described with particular reference to the accompanying drawings.

DETAILED DESCRIPTION OF THE INVENTION

The present application discloses a method and apparatus for minimizing multipath and Doppler interference for receiving commercial FM signals, which use their SCA to transmit secondary signals in a QAM, or other phase dependant format. This method includes using the received 19 KHz stereo pilot signal of the station as a phase reference in demodulating the QAM signal. Phase measurements of the pilot signal are tracked over a predetermined time period, or tracking period, to support demodulation of the QAM signal, nominally at the center of that tracking period. Comparison of phase values before and after the demodulation point indicates changes in the phase value, including both sudden phase shifts in the pilot signal and gradual changes therein. From this comparison, a phase determination of the pilot signal is made for demodulation purposes. One approach to determining the appropriate phase value uses a median filter of the phase measurements over the tracking period.

When such an FM signal plus SCA QAM signal is received, the stereo pilot signal and the QAM signal are filtered and digitized for processing. Either the filtering or digitizing may occur first. If filtering is first, it is done in analog form. If digitizing is done first, the filtering is done digitally. The pilot signal is then measured or detected for zero crossings and the actual phase is thereby measured.

Measurement of the phase values is enhanced by the removal of the normal $2\Pi$ per cycle phase rotation of every sinusoidal signal. This removal may be thought of as a de-trending of the phase signal, and is accomplished, in one form, by multiplying the measured pilot phase signal by the negative complex sinusoid ($e-j2\Pi 19$ KHzt). This removal may be done by any suitable method, such as digitally. Other methods may include an analog process prior to digitization of the pilot signal.

The measured phase values are stored, along with the corresponding digitized signal in the QAM band. The stored phase values are tracked over a predetermined period or tracking period and the QAM signal is demodulated at approximately the center of that tracking period. Any suitable algorithm may be used to detect changes in the measured phase value by comparing the tracked phase values in the tracking period. In one form, a median filter is used to determine the appropriate phase value.

A median filter is a form of interpolation. Measured phase values over the tracking period are reordered according to amplitude and then the center value is chosen. For example, seven values might be reordered, and the fourth value in the reordered series is used regardless of its mathematical relationship to the end values. Through this method, step changes in the measured phase value, as caused by multipath, are implemented for demodulation on or about the appropriate point in time and in the absence of any clearly erroneous measurements, as might be caused by conflicts from multiple signals.

Figure 1:
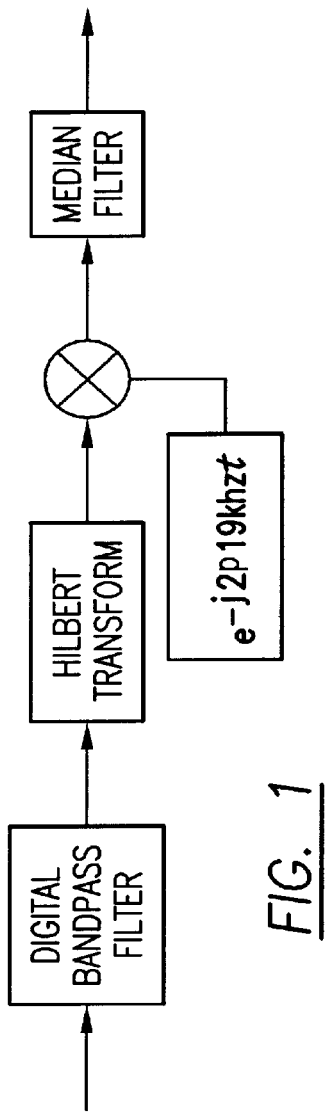
FIG. 1 shows a portion of an FM SCA QAM receiver used for determining the phase of the normal stereo pilot signal as a block diagram.
Figure 2:
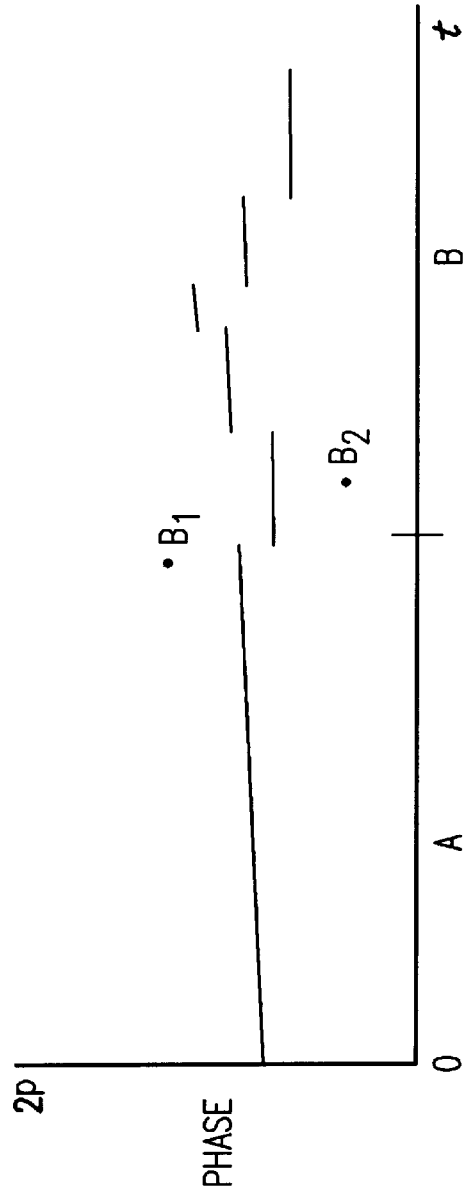
FIG. 2 shows a graph of phase versus time of possible pilot signal phase variations with normal phase $2\Pi$ per cycle rotation removed.

FIGS. 1 and 2 provide one example of a system which uses these principles. FIG. 1 shows a portion of an FM SCA QAM receiver used for determining the phase of the normal stereo pilot signal. A digital bandpass filter centered at 19 KHz is used to separate the digitized values of the received pilot signal. These values are then passed through a Hilbert transform to produce the I and Q values which will be used for calculating the phase value, which is the arctan(Q/I). As mentioned, the phase of the pilot signal as with any sinusoidal signal, is constantly rotating through 360 degrees or 2Π radians every cycle. Multiplication of the I and Q pilot signal values by a negatively rotating 19 KHz signal, as represented by the complex sinusoid of e-j2Π19 KHzt, removes the normal phase rotation or de-trends the phase of the pilot signal. With this cycling of the phase value removed, changes in the measured phase due to multipath, Doppler, frequency shift, etc., become more apparent.

FIG. 2 shows a representation of possible, random, pilot signal phase variations, with the normal phase rotation removed. Without any phase or frequency variation in the received signal, the measured phase would appear as a constant horizontal line. As shown, the trending upward of portion A of the graph indicates a positive Doppler effect, such as when the receiver is approaching the transmitter. Portion B of the graph represents step changes caused by multipath interference. It is well understood that conflicts between received signals at the point of the step changes can cause clearly erroneous readings B1, B2 in the phase measure. Such erroneous measurements may also be caused by various other anomalies. As mentioned the median filter interpolation method of the phase values removes these erroneous measurements from use in the demodulation process.

A median filter takes the values in the tracking period and orders them by amplitude. It then outputs the measured value located at the center of this reordered series as the proper phase reference. Thus, when the measured phase value is slowly changing in one direction, the median value will likely be the phase measurement at the actual center of the tracking period coinciding with the demodulation point. When spurious noise causes one or two phase values to be significantly different from the other values, these significantly different values will be located at the ends of the reordered series of values and a different and more average value will be outputted as the median value. When a step change occurs in the measured phase, the value used for QAM demodulation switches cleanly from the old values to the new values and any spurious signals in the measured values are ignored. The present invention can be used with secondary signals such as QAM or other phase dependent formats, phase shift keying and FSK.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for minimizing multipath interference in the broadcast of FM signals that use secondary signals in a QAM format comprising the steps of:
   a) generating an FM stereo pilot signal of a predetermined median frequency and secondary signals in a quadrature amplitude modulation format;
   a1) receiving said FM stereo pilot signal of said predetermined frequency;
   b) tracking a time series of phase measurements of the received FM stereo pilot signal;
   c) determining the proper phase reference of the FM pilot signal for demodulation of the QAM secondary signals at approximately the center of the time series;
   d) comparing the phase measurements over the time series to detect changes in said phase based upon multipath signal interference and relative movement between transmitter and receiver;
   e) selecting the appropriate phase modulation for demodulation of said QAM secondary signals;
   e1) demodulating the QAM secondary signals without multiple path interference.

2. A method as in claim 1 including the step of:
   f) comparing said phase measurements using an algorithm implemented by a median filter.

3. A method for minimizing multipath interference in the broadcast of FM signals that use secondary signals in a QAM format comprising the steps of:
   a) generating an FM stereo pilot signal of a predetermined median frequency and secondary signals in a quadrature amplitude modulation format;
   a1) receiving said FM stereo pilot signal of said predetermined frequency;
   b) tracking a time series of phase measurements of the received FM stereo pilot signal;
   c) determining the proper phase reference of the FM pilot signal for demodulation of the QAM secondary signal at approximately the center of the time series;
   d) comparing the phase measurements over the time series to detect changes in said phase based upon multipath signal interference and relative movement between transmitter and receiver;
   e) selecting the appropriate phase modulation for demodulation of said QAM secondary signals;
   e1) demodulating the QAM secondary signals without multiple path interference;
   f) comparing said phase measurements using an algorithm implemented by a median filter; and
   g) reordering measured phase values by amplitude in choosing the value at the center of the reordered series.

4. A method as in claim 3 including the step of:
   h) removing the normal 2Π for cycle phase rotation of the FM pilot signal as part of the phase measurement.

5. A method as in claim 4 including the step of:
   i) using a Hilbert transform for removing the normal 2Π for cycle phase rotation.

6. An apparatus for minimizing multipath interference in a commercial FM broadcast and receiver system that utilize commercial FM signals that include subsidiary communication authority secondary signals in a quadrature amplitude modulation (QAM) comprising:

antennae means for receiving commercial FM signals of a predetermined pilot frequency;

means for tracking a time series of phase measurements of the received FM pilot signal for determining the proper phase reference for demodulation of the secondary QAM signals;

means for demodulation of the QAM secondary signals at approximately the center of said time series using the proper phase reference of said pilot signal to minimize multipath interference caused by step changes in the phase of the received signal and movement between the transmitter and the receiver;

means for comparing the phase measurement over the time series that includes detecting sudden changes caused by multipath signal interference in phase and gradual changes in phase caused by relative movement between the transmitter and the receiver; and said means for choosing the appropriate phase reference including a median filter that reorders measured phase values by amplitude and chooses the value at the center of the reordered series.

7. A device as in claim 6 including;

means for removing the normal 2Π per cycle phase rotation of the pilot signal as part of the phase measurement.

8. A method for minimizing multiple path interference for wireless broadcast RF signals that includes a bandwidth that has subsidiary communications authority including secondary signals that use a phase modulation format subject to multiple path and Doppler interference comprises the steps of:

a) broadcasting a pilot signal at a predetermined radio frequency that is not phase dependent on modulation and secondary signals using a phase modulation format;

b) receiving said pilot signal and said secondary signals utilizing a phase modulation format;

c) tracking a time series of phase measurements of the received pilot signal;

d) determining from the tracked time series of phase measurement the proper phase reference from said pilot signal for secondary signal modulation;

e) selecting the appropriate phase measurement for demodulation of the phase dependent secondary signals to minimize multiple path interference; and f) demodulating the data from said secondary signals that was translated in a phase responsive format.

9. The method as in claim 8 including the step of:

g) comparing the phase measurements over the time series to detect sudden changes as caused by multipath signal interference and detecting gradual changes in phase caused by relative movement between transmitter and receiver.

10. The method as in claim 9, including the step of:

h) employing a median filter for choosing the appropriate phase reference for demodulation purposes to minimize interference from multipath signal interference.

11. The method as in claim 10, which includes the step of:

i) implementing the median filter with an algorithm which reorders measured phase values by amplitude and choosing the value at the center of the reordered series as the appropriate phase reference for demodulation of said second signals.

12. The method as in claim 11, including the step of:

j) 2Π per cycle phase rotation of said pilot signal as part of the phase measurement.

13. The method as in claim 8, wherein:

said pilot signal is a commercial frequency modulated signal that includes subsidiary communications authority for transmitting secondary signals in a quadrature amplitude modulation format.

14. A system for minimizing multipath interference for wireless broadcast RF signals that includes a pilot signal at a predetermined frequency, the modulation and demodulation of which is not phase dependent and that has sufficient bandwidth to have subsidiary communication authority that includes secondary signals at a different frequency that use a phase modulation format that subjects the received secondary signals to multiple path and Doppler interference comprising:

means for transmitting a pilot RF signal at a predetermined frequency, the modulation of which is not phase dependent and including the transmission of secondary signals using a phase modulation format that is incorporated into the bandwidth of the pilot signal under the subsidiary communication authority;

means for receiving said pilot signal and said secondary signals;

means connected to the receiving means for tracking a time series of phase measurements of the received pilot signal;

means for determining from the tracked time series of phase measurements the proper phase reference for appropriate secondary signals demodulation connected to said means for tracking; and means for selecting the appropriate phase measurement for demodulation of the phase dependent secondary signals to minimize multipath interference.

15. A system as in claim 14 including:

means connected to the means for determining the proper phase reference for comparing the phase measurements over the time series to detect sudden changes as might be caused by multiple path signal interference and gradual changes in phase as might be caused by relative movement between the transmitter and the receiver.

16. A system as in claim 15 including:

a median filter and an algorithm for choosing the appropriate phase reference for demodulation of said secondary signals implemented by said median filter, which reorders measured phase values by amplitude and chooses the phase value at the center of the reordered series to ensure appropriate phase reference for demodulation.

17. A system as in claim 16, including:

means for removing the normal 2Π per cycle phase rotation of the pilot signal as part of the phase measurement connected to said means for determining the proper phase reference of demodulation of secondary signals.

18. A system as in claim 14 wherein:

said pilot signals are frequency modulated commercial signals that include secondary signals in a quadrature amplitude modulation format.

* * * * *